(12) United States Patent
Chang et al.

(10) Patent No.: US 11,313,043 B2
(45) Date of Patent: Apr. 26, 2022

(54) COATING CARBON STEEL TUBING WITH IRON SULFIDE

(71) Applicant: Saudi Arabian Oil Company, Dhahran (SA)

(72) Inventors: Fakuen Frank Chang, Dhahran (SA); Tao Chen, Dhahran (SA); Qiwei Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 144 days.

(21) Appl. No.: 15/919,900

(22) Filed: Mar. 13, 2018

(65) Prior Publication Data

US 2018/0265992 A1 Sep. 20, 2018

Related U.S. Application Data

(60) Provisional application No. 62/471,143, filed on Mar. 14, 2017.

(51) Int. Cl.
| | |
|---|---|
| *C23F 11/18* | (2006.01) |
| *C09K 8/54* | (2006.01) |
| *C23C 22/50* | (2006.01) |
| *C23C 22/68* | (2006.01) |
| *C23C 22/62* | (2006.01) |

(52) U.S. Cl.
CPC .............. *C23F 11/182* (2013.01); *C09K 8/54* (2013.01); *C23C 22/50* (2013.01); *C23C 22/62* (2013.01); *C23C 22/68* (2013.01); *C09K 2208/32* (2013.01)

(58) Field of Classification Search
CPC ..... C23F 11/182; C09K 8/54; C09K 2208/32; C23C 22/50; C23C 22/62; C23C 22/68
USPC ......................................................... 148/270
See application file for complete search history.

(56) References Cited

U.S. PATENT DOCUMENTS

| | | |
|---|---|---|
| 2,973,316 A | 7/1957 | Howland |
| 2,844,497 A | 7/1958 | Henricks |
| 3,516,922 A | 6/1970 | Anzilotti |
| 3,981,780 A | 9/1976 | Scherrer et al. |
| 4,945,758 A | 8/1990 | Carpenter |

(Continued)

FOREIGN PATENT DOCUMENTS

CA 2546164 3/2007

OTHER PUBLICATIONS

Koujan Fertilizers & Chemicals, Liquid Potassium Polysulfide (Year: 2018).*

(Continued)

*Primary Examiner* — Brian D Walck
*Assistant Examiner* — Danielle M. Carda
(74) *Attorney, Agent, or Firm* — Fish & Richardson P.C.

(57) ABSTRACT

Treating carbon steel tubing includes contacting the carbon steel tubing with a first treatment solution including a salt; corroding the carbon steel tubing with the salt to yield a corroded surface on the carbon steel tubing; contacting the corroded surface on the carbon steel tubing with a second treatment solution comprising sulfide ions; and forming an iron sulfide layer on the corroded surface of the carbon steel tubing by chemically bonding the sulfide ions in the second treatment solution with iron in the carbon steel tubing. In some cases, the first treatment solution also includes sulfide ions, and the iron sulfide layer is formed by contacting the carbon steel tubing with the first treatment solution.

17 Claims, 3 Drawing Sheets

(56) References Cited

U.S. PATENT DOCUMENTS

| | | | | |
|---|---|---|---|---|
| 5,188,179 | A * | 2/1993 | Gay | C09K 8/54 166/310 |
| 5,869,195 | A | 2/1999 | Ramanarayanan | |
| 6,605,234 | B1 | 8/2003 | Roof | |
| 6,620,341 | B1 * | 9/2003 | Verma | C09K 8/54 252/389.54 |
| 8,211,548 | B2 | 7/2012 | Chun | |
| 8,668,887 | B2 | 3/2014 | McGarvey et al. | |
| 2006/0029808 | A1 | 2/2006 | Zhai et al. | |
| 2008/0236842 | A1 | 10/2008 | Bhavsar et al. | |
| 2009/0324820 | A1 * | 12/2009 | Chartier | C23F 11/10 427/239 |
| 2014/0011013 | A1 | 1/2014 | Jin et al. | |
| 2015/0083397 | A1 * | 3/2015 | Monroe | C09K 8/605 166/244.1 |

OTHER PUBLICATIONS

Zhang et al., "Corrosion Monitoring Under Iron Sulfide Deposite: Testing Method Development," XP055471382, Corrosion 2014, Mar. 9, 2014, 15 pages.

Nasr-El-Din et al., "Iron Sulfide Scale: Formation, Removal and Prevention," International Symposium on Oilfield Scale, Jan. 30, 2001, 13 pages.

International Search Report and Written Opinion issued in International Application No. PCT/US2018/022150 dated May 8, 2018, 14 pages.

Feng et al., "Effects of $CO_2$ and $H_2S$ on Corrosion of Martensitic Steels in NaCl at Low Temperature," Paper No. 7659, NACE International, Corrosion 2016 Conference and Expo, Mar. 6-10, 2016, 13 pages.

Oilfieldwiki.com [online], "Iron Sulfide (FeS)," available on or before Dec. 30, 2013, via Internet Archive: Wayback Machine URL <https://web.archive.org/web/20131230064221/http://www.oilfieldwiki.com/wiki/Iron_sulfide_(FeS)> [retrieved on Mar. 15, 2018], from URL: <http://www.oilfieldwiki.com/wiki/Iron_sulfide_(FeS)>, 5 pages.

EPO Communication Pursuant to Article 94.3 in European Appln. No. 18715331.7, dated Nov. 23, 2020, 5 pages.

GCC Examination Report in GCC Appln. No. GC 2018-34951, dated Aug. 31, 2020, 5 pages.

GCC Examination Report in GCC Appln. No. GC 2018-34951, dated Mar. 11, 2021, 6 pages.

* cited by examiner

COATING CARBON STEEL TUBING WITH IRON SULFIDE

CLAIM OF PRIORITY

This application claims the benefit of U.S. Provisional Application No. 62/471,143, filed Mar. 14, 2017. The entire contents of the foregoing are hereby incorporated by reference.

TECHNICAL FIELD

This document relates to methods for coating carbon steel tubing with iron sulfide in oilfield applications, in particular to reduce corrosion and surface scaling.

BACKGROUND

Carbon steel tubing is widely used as well completion material in oil and gas wells in oilfield applications. Corrosion of carbon steel tubing and scaling on carbon steel tubing in the presence of water is a common problem in oil and gas wells. The presence of corrosive materials, such as carbon dioxide and hydrogen sulfide, exacerbates the problem. Carbon steel tubing often fails due to corrosion, including sour general corrosion and sour pitting corrosion. In addition, scaling on carbon steel tubing in contact with hard water creates technical problems in oil and gas production, including pipe or valve blockage, under deposit corrosion, and unscheduled equipment shutdown. Corrosion resistant alloys and surface coatings have been used to mitigate the failure of carbon steel tubing. However, corrosion resistant alloys are expensive, and surface coatings have limitations related to temperature stability, abrasion resistance, offline treatment, and manufacturing requirements.

SUMMARY

In a first general aspect, treating carbon steel tubing includes contacting the carbon steel tubing with a first treatment solution including a salt; corroding the carbon steel tubing with the salt to yield a corroded surface on the carbon steel tubing; contacting the corroded surface on the carbon steel tubing with a second treatment solution comprising sulfide ions; and forming an iron sulfide layer on the corroded surface of the carbon steel tubing by chemically bonding the sulfide ions in the second treatment solution with iron in the carbon steel tubing.

Implementations of the first general aspect may include one or more of the following features.

In some implementations, the carbon steel tubing is located in a subterranean formation. Treating the carbon steel tubing may occur in situ.

In some implementations, the first treatment solution and the second treatment solution are the same solution, and contacting the carbon steel tubing with the first treatment solution and contacting the corroded surface on the carbon steel tubing with the second treatment solution occur at the same time.

In some implementations, a temperature of the first treatment solution is at least 100° F. or at least 150° F. The carbon steel tubing may be contacted with the first treatment solution for at least 5 hours, at least 10 hours, at least 15 hours, or at least 20 hours.

In some implementations, the salt includes at least one of sodium, magnesium, potassium, ammonium, and calcium. In some implementations, the salt includes at least one of chloride, phosphate, carbonate, and bicarbonate. A concentration of the salt in the first treatment solution is typically at least 100,000 ppm by weight, at least 150,000 ppm by weight, or at least 200,000 ppm by weight.

In some implementations, a concentration of the sulfide ions in the second treatment solution is at least 50 ppm by weight, at least 100 ppm by weight, at least 150 ppm by weight, or at least 200 ppm by weight.

In some implementations, a thickness of the iron sulfide layer on the carbon steel tubing is at least 10 µm.

In some implementations, the iron sulfide layer forms a hydrophobic coating on the carbon steel tubing.

A pH of the first treatment solution is typically in a range of 2 to 10. A pH of the second treatment solution is typically in a range of 3 to 8. In some implementations, the first treatment solution and the second treatment solution are the same, and the pH of the first treatment solution is in a range of 2 to 10.

In a second general aspect, treating carbon steel tubing includes contacting the carbon steel tubing with a treatment solution comprising sulfide ions and a salt; corroding the carbon steel tubing with the salt to yield a corroded surface on the carbon steel tubing; and forming an iron sulfide layer on the corroded surface of the carbon steel tubing by chemically bonding the sulfide ions with iron in the carbon steel tubing.

Implementations of the second general aspect may include one or more of the following features.

In some implementations, the carbon steel tubing is located in a subterranean formation. Treating the carbon steel tubing may occur in situ.

In some implementations, a temperature of the treatment solution is at least 100° F. or at least 150° F. The carbon steel tubing may be contacted with the treatment solution for at least 5 hours, at least 10 hours, at least 15 hours, or at least 20 hours.

In some implementations, the salt includes at least one of sodium, magnesium, potassium, ammonium, and calcium. In some implementations, the salt includes at least one of chloride, phosphate, carbonate, and bicarbonate. A concentration of the salt in the treatment solution is typically at least 100,000 ppm by weight, at least 150,000 ppm by weight, or at least 200,000 ppm by weight. A concentration of the sulfide ions in the treatment solution is typically at least 50 ppm by weight, at least 100 ppm by weight, at least 150 ppm by weight, or at least 200 ppm by weight.

In some implementations, a thickness of the iron sulfide layer on the carbon steel tubing is at least 10 µm.

In some implementations, the iron sulfide layer forms a hydrophobic coating on the carbon steel tubing.

A pH of the treatment solution is typically in a range of 2 to 10.

Embodiments described herein advantageously inhibit or prevent tubing corrosion and surface scaling in carbon steel tubing by forming a chemically bonded iron sulfide protective layer on the carbon steel tubing. The iron sulfide layer is hydrophobic, and therefore reduces scale formation on the carbon steel tubing. In addition, coating carbon steel tubing with iron sulfide is achieved in situ, and the iron sulfide layer can be repaired and maintained as needed by repeating the in situ process. Operation costs are reduced by reducing the corrosivity of the carbon steel tubing and reducing the frequency of treatment for scale removal, and capital expenditures are reduced by increasing the durability of the carbon steel tubing.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Corrosion and surface scale formation in oil and gas wells can be reduced by forming a hydrophobic layer of iron sulfide on carbon steel tubing in situ. The layer of iron sulfide inhibits or prevents contact of the surface of the carbon steel tubing with produced water, thereby reducing corrosion of the carbon steel tubing and formation of additional iron sulfide on the surface of the carbon steel tubing.

Forming a layer of iron sulfide on the carbon steel tubing can be achieved in situ by corroding the surface of the carbon steel tubing to expose ferrous ions, and contacting the exposed ferrous ions with sulfide ions. The ferrous ions and sulfide ions react chemically to yield iron sulfide, thereby forming a layer of iron sulfide on the surface of the carbon steel tubing. The iron sulfide is hydrophobic, and may be in the form of a continuous layer on the carbon steel tubing, thereby forming a barrier between the carbon steel tubing and water flowing through the tubing.

Figure 1:
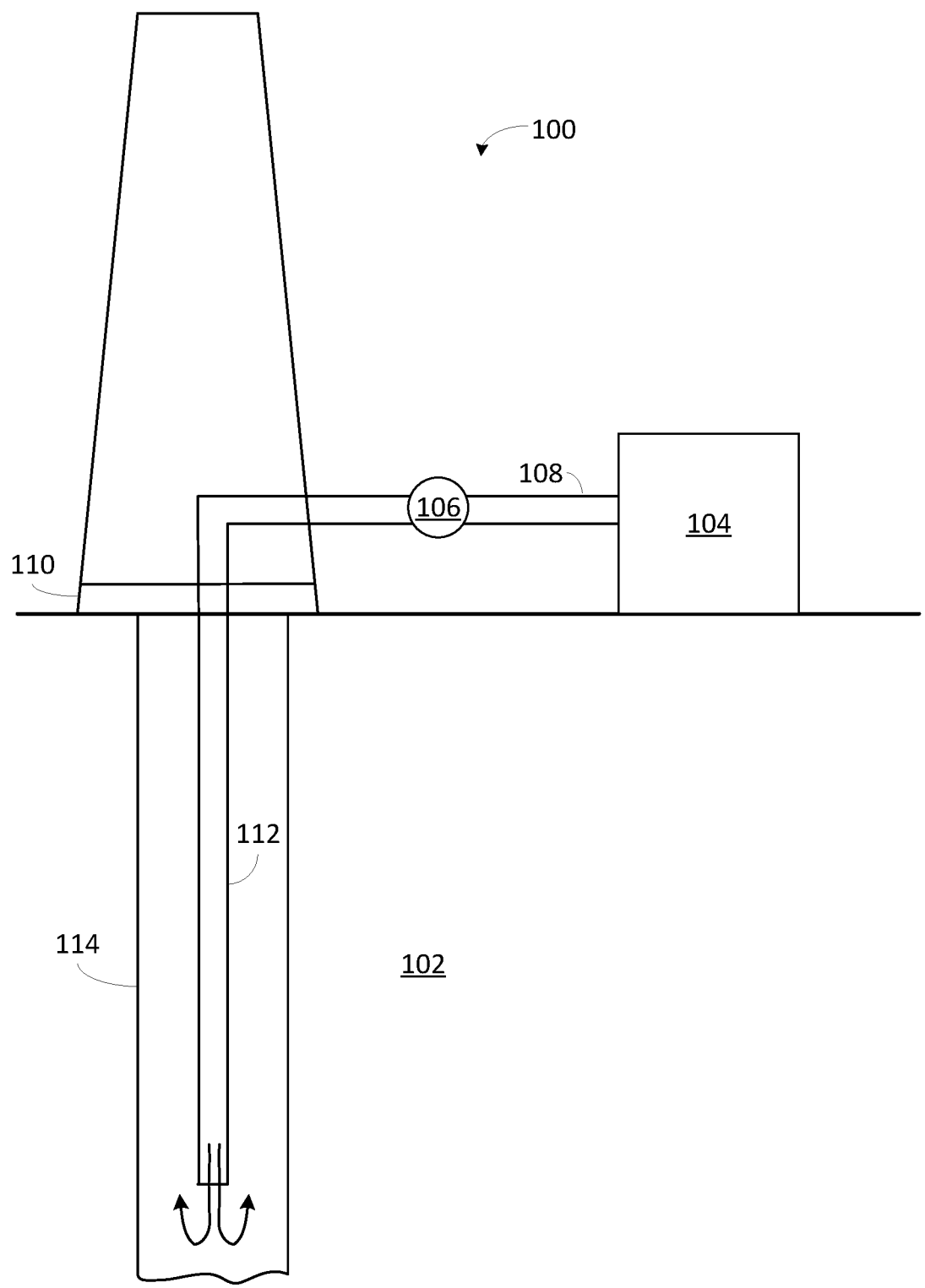
FIG. 1 depicts an exemplary system for forming an iron sulfide layer on carbon steel tubing in situ.

FIG. 1 depicts exemplary system 100 for forming an iron sulfide layer on carbon steel tubing in subterranean formation 102. A treatment solution from source 104 is pumped via pump 106 through line 108 to wellhead 110, and enters carbon steel tubing 112 in wellbore 114. Carbon steel tubing 112 is typically production steel tubing. The treatment solution is typically an aqueous solution including sulfide ions and one or more salts. The carbon steel tubing is contacted with the treatment solution for a length of time, thereby corroding the carbon steel tubing and exposing ferrous ions on the surface of the carbon steel tubing. In some embodiments, contacting the carbon steel tubing with the treatment solution includes flowing the treatment solution through the carbon steel tubing. The sulfide ions react with the exposed ferrous ions to yield a layer of iron sulfide on the surface of the carbon steel tubing. Thus, the iron sulfide forms a protective layer on the surface of the carbon steel tubing. In some embodiments, a thickness of the iron sulfide layer is in a range of 10 μm to 1000 μm.

The treatment solution includes one or more salts. Examples of suitable cations in the salts include sodium, magnesium, potassium, ammonium, and calcium. Examples of suitable anions in the salts include chloride, phosphate, carbonate, and bicarbonate. A total concentration of the salt in the treatment solution is at least 100,000 ppm by weight. In some embodiments, a total concentration of the salt in the treatment solution is at least 150,000 ppm by weight or at least 200,000 ppm by weight. In certain embodiments, a total concentration of the salt in the treatment solution is in a range of 5,000 ppm by weight to 300,000 ppm by weight. In certain embodiments, a concentration of the sulfide ions in the treatment solution is in a range of 50 ppm by weight to 50,000 ppm by weight. In some embodiments, a pH of the treatment solution is in a range of 2 to 10.

In some embodiments, the carbon steel tubing is contacted with the treatment solution for at least five hours, at least ten hours, at least fifteen hours, or at least twenty hours. In certain embodiments, the carbon steel tubing is contacted with the treatment solution for a length of time in a range between 5 hours and 48 hours. In some embodiments, a temperature of the treatment solution in contact with the carbon steel tubing is at least 100° F. or at least 150° F. In certain embodiments, a temperature of the treatment solution is in a range of 100° F. to 200° F., or 125° F. to 175° F.

A thickness and density of the iron sulfide layer may be controlled by selecting a concentration of salt in the treatment solution, a concentration of sulfide ions in the treatment solution, a pH of the treatment solution, a temperature of the treatment solution, a pressure of the environment under which the treatment solution contacts the carbon steel tubing, or a combination thereof. In some embodiments, the treatment solution includes an additive, such as a catalyst or a polymer, selected to promote formation of a uniform iron sulfide layer.

In some embodiments, the treatment solution is provided to the carbon steel tubing as a first treatment solution and a second treatment solution. In one exemplary embodiment, the first treatment solution from source 104 and the second treatment solution from source 104' is pumped via pump 106 through line 108 to wellhead 110, and enters carbon steel tubing 112 in wellbore 114. The first treatment solution typically includes the salt and the second treatment solution typically includes the sulfide ions. The first treatment solution and the second treatment solution may be provided to carbon steel tubing 112 at the same time or sequentially. If the first treatment solution and the second treatment solution are provided sequentially, the first treatment solution is typically provided prior to the second treatment solution.

The first treatment solution includes one or more salts. Examples of suitable cations in the salts include sodium, magnesium, potassium, ammonium, and calcium. Examples of one or more suitable anions in the salts include sulfate, chloride, phosphate, carbonate, and bicarbonate. A total concentration of the salt in the first treatment solution is at least 100,000 ppm by weight. In some embodiments, a total concentration of the salt in the first treatment solution is at least 150,000 ppm by weight or at least 200,000 ppm by weight. In certain embodiments, a total concentration of the salt in the first treatment solution is in a range of 5,000 ppm by weight to 300,000 ppm by weight. In some embodiments, a pH of the first treatment solution is in a range of 2 to 10.

In some embodiments, a concentration of the sulfide ions in the second treatment solution is in a range of 3000 ppm by weight to 150,000 ppm by weight. In some embodiments, a pH of the second treatment solution is in a range of 3 to 8.

In some embodiments, the carbon steel tubing is contacted with the first treatment solution, the second treatment solution, or both for at least five hours, at least ten hours, at least fifteen hours, or at least twenty hours. In certain embodiments, the carbon steel tubing is contacted with the treatment solution for a length of time in a range between 5 hours and 48 hours. In some embodiments, a temperature of the treatment solution in contact with the carbon steel tubing is at least 100° F. or at least 150° F. In certain embodiments, a temperature of the treatment solution is in a range of 100° F. to 350° F.

An iron sulfide layer formed on carbon steel tubing may crack or thin over time. The iron sulfide layer can be replenished by re-treating the carbon steel tubing with the treatment solution. When the well is a sour well, hydrogen sulfide from the sour flowing stream may react with exposed iron on the surface of the carbon steel tubing to seal a crack or thin region in the iron sulfide layer.

Figure 2:
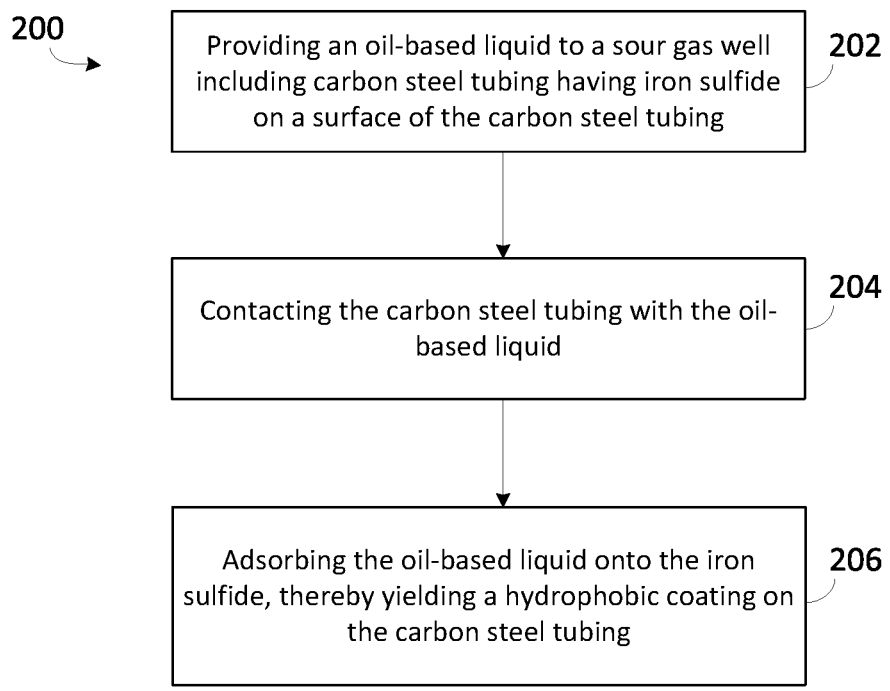
FIG. 2 is a flowchart showing operations in a first exemplary process for forming an iron sulfide layer on carbon steel tubing in situ.

FIG. 2 is a flowchart showing operations in an exemplary process 200 for forming a layer of iron sulfide on a carbon steel tubing in situ. In 202, carbon steel tubing is contacted with the treatment solution and under conditions described with respect to FIG. 1. In 204, the carbon steel tubing is corroded with the salt to yield a corroded surface on the carbon steel tubing. In 206, an iron sulfide layer is formed on the surface of the carbon steel tubing by chemically bonding the sulfide ions with the iron in the carbon steel tubing.

Figure 3:
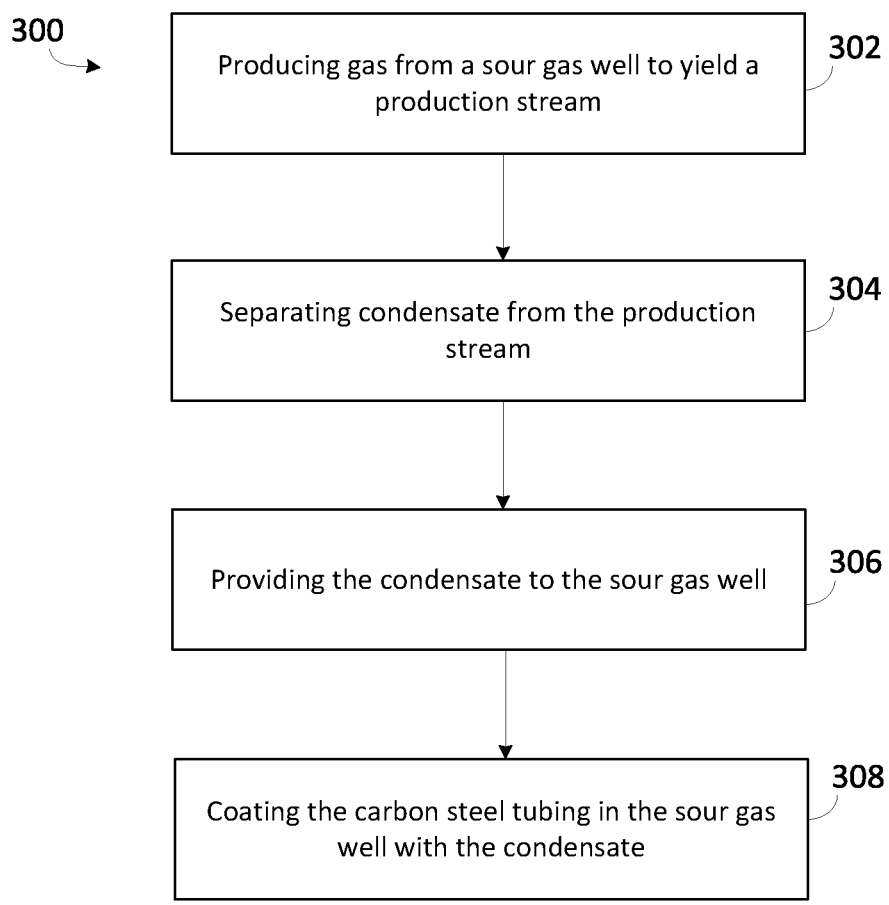
FIG. 3 is a flowchart showing operations in a second exemplary process for forming an iron sulfide layer on carbon steel tubing in situ.

FIG. 3 is a flowchart showing operations in an exemplary process 300 for forming a layer of iron sulfide on a carbon steel tubing in situ. In 302, the carbon steel tubing is contacted with the first treatment solution and under conditions described with respect to FIG. 1. In 304, the carbon steel tubing is corroded with the salt to yield a corroded surface on the carbon steel tubing. In 306, the corroded surface on the carbon steel tubing is contacted with the second treatment solution and under conditions described with respect to FIG. 1. In 308, an iron sulfide layer is formed on the corroded surface of the carbon steel tubing by chemically bonding the sulfide ions in the second treatment solution with iron in the carbon steel tubing.

Definitions

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise. The term "about" can allow for a degree of variability in a value or range, for example, within 10%, within 5%, or within 1% of a stated value or of a stated limit of a range.

The term "fluid" refers to gases, liquids, gels, slurries with a high solids content, and critical and supercritical materials.

The term "subterranean formation" refers to any material under the surface of the earth, including under the surface of the bottom of the ocean. For example, a subterranean formation can be any section of a wellbore and any section of a subterranean petroleum- or water-producing formation or region in fluid contact with the wellbore. In some examples, a subterranean formation can be any belowground region that can produce liquid or gaseous petroleum materials, water, or any section below-ground in fluid contact therewith. For example, a subterranean formation can be at least one of an area desired to be fractured, a fracture, or an area surrounding a fracture, and a flow pathway or an area surrounding a flow pathway, where a fracture or a flow pathway can be optionally fluidly connected to a subterranean petroleum- or water-producing region, directly or through one or more fractures or flow pathways.

Example

In one example, aqueous treatment solutions A, B and C were prepared. Aqueous treatment solution A contained 62,700 ppm sodium by weight, 22,000 ppm calcium by weight, 1,180 ppm magnesium by weight, 139,000 ppm chloride by weight, and 25 ppm sulfate by weight. Aqueous treatment solution B contained 62,700 ppm by weight sodium, 22,000 ppm calcium by weight, 1,180 ppm magnesium by weight, 139,000 ppm chloride by weight, 25 ppm sulfate by weight, and 100 ppm sulfide by weight. Aqueous treatment solution C contained 62,700 ppm by weight sodium, 22,000 ppm calcium by weight, 1,180 ppm magnesium by weight, 139,000 ppm chloride by weight, 25 ppm sulfate by weight, and 200 ppm sulfide by weight. The sodium, sulfide, and chloride was provided in the form of sodium sulfate, sodium sulfide, calcium chloride, magnesium chloride, and sodium chloride.

Aqueous treatment solution A was a control (no sulfide), and aqueous treatment solutions B and C had different amounts of sulfide (100 ppm and 200 ppm by weight, respectively). Test coupons 1, 2, and 3 (dimensions 3.03× 1.00 cm×0.44 cm) were immersed in aqueous treatment solutions A, B, and C, respectively, at 176° F. for 22 hours. After 22 hours, test coupon 1 showed a weight loss of 2 mg, test coupon 2 showed a weight loss of 0.2 mg, and test coupon 3 showed a weight gain of 0.3 mg. The change in weight of test coupons 2 and 3 is due to corrosion (weight loss) as well as the formation of iron sulfide on the surface (weight gain). A dense black iron sulfide film was observed on the surfaces of test coupons 2 and 3 during the 22 hour test period. The iron sulfide film formed on the surfaces of test coupons 2 and 3 (15 μm and 20 μm, respectively) worked as a protective film and reduced further corrosion on the test coupons, resulting weight loss of no more than 10% of that of test coupon 1, on which no protective iron sulfide film was formed.

Certain Embodiments

In some embodiments, this document provides methods of treating carbon steel tubing as described in paragraphs 1-45.

Paragraph 1. A method of treating carbon steel tubing, the method comprising:
  contacting the carbon steel tubing with a first treatment solution comprising a salt; corroding the carbon steel tubing with the salt to yield a corroded surface on the carbon steel tubing;
  contacting the corroded surface on the carbon steel tubing with a second treatment solution comprising sulfide ions; and
  forming an iron sulfide layer on the corroded surface of the carbon steel tubing by chemically bonding the sulfide ions in the second treatment solution with iron in the carbon steel tubing.

Paragraph 2. The method of paragraph 1, wherein the carbon steel tubing is located in a subterranean formation.

Paragraph 3. The method of paragraph 1 or paragraph 2, wherein treating the carbon steel tubing occurs in situ.

Paragraph 4. The method of any one of the above paragraphs, wherein the first treatment solution and the second treatment solution are the same solution, and contacting the carbon steel tubing with the first treatment solution and contacting the corroded surface on the carbon steel tubing with the second treatment solution occur at the same time.

Paragraph 5. The method of any one of the above paragraphs, wherein a temperature of the first treatment solution is at least 100° F.

Paragraph 6. The method of any one of the above paragraphs, wherein a temperature of the first treatment solution is at least 150° F.

Paragraph 7. The method of any one of the above paragraphs, comprising contacting the carbon steel tubing with the first treatment solution for at least five hours.

Paragraph 8. The method of any one of the above paragraphs, comprising contacting the carbon steel tubing with the first treatment solution for at least ten hours.

Paragraph 9. The method of any one of the above paragraphs, comprising contacting the carbon steel tubing with the first treatment solution for at least fifteen hours.

Paragraph 10. The method of any one of the above paragraphs, comprising contacting the carbon steel tubing with the first treatment solution for at least twenty hours.

Paragraph 11. The method of any one of the above paragraphs, wherein salt includes at least one of sodium, magnesium, potassium, ammonium, and calcium.

Paragraph 12. The method of any one of the above paragraphs, wherein the salt includes at least one of chloride, phosphate, carbonate, and bicarbonate.

Paragraph 13. The method of any one of the above paragraphs, wherein a concentration of the salt in the first treatment solution is at least 100,000 ppm by weight.

Paragraph 14. The method of paragraph 13, wherein the concentration of the salt in the first treatment solution is at least 150,000 ppm by weight.

Paragraph 15. The method of paragraph 14, wherein the concentration of the salt in the first treatment solution is at least 200,000 ppm by weight.

Paragraph 16. The method of any one of the above paragraphs, wherein a concentration of the sulfide ions in the second treatment solution is at least 50 ppm by weight.

Paragraph 17. The method of paragraph 16, wherein the concentration of the sulfide ions in the second treatment solution is at least 100 ppm by weight.

Paragraph 18. The method of paragraph 17, wherein the concentration of the sulfide ions in the second treatment solution is at least 150 ppm by weight.

Paragraph 19. The method of paragraph 18, wherein the concentration of the sulfide ions in the second treatment solution is at least 200 ppm by weight.

Paragraph 20. The method of any one of the above paragraphs, wherein a thickness of the iron sulfide layer on the carbon steel tubing is at least 10 μm.

Paragraph 21. The method of any one of the above paragraphs, wherein the iron sulfide layer forms a hydrophobic coating on the carbon steel tubing.

Paragraph 22. The method of any one of the above paragraphs, wherein a pH of the first treatment solution is in a range of 2 to 10.

Paragraph 23. The method of any one of the above paragraphs, wherein a pH of the second treatment solution is in a range of 3 to 8.

Paragraph 24. The method of any one of paragraphs 1 through 21, wherein the first treatment solution and the second treatment solution are the same, and the pH of the treatment solution is in a range of 2 to 10.

Paragraph 25. A method of treating carbon steel tubing, the method comprising:
contacting the carbon steel tubing with a treatment solution comprising sulfide ions and a salt;
corroding the carbon steel tubing with the salt to yield a corroded surface on the carbon steel tubing; and
forming an iron sulfide layer on the corroded surface of the carbon steel tubing by chemically bonding the sulfide ions with iron in the carbon steel tubing.

Paragraph 26. The method of paragraph 25, wherein the carbon steel tubing is located in a subterranean formation.

Paragraph 27. The method of paragraph 25 or paragraph 26, wherein treating the carbon steel tubing occurs in situ.

Paragraph 28. The method of any one of paragraphs 25 through 27, wherein a temperature of the treatment solution is at least 100° F.

Paragraph 29. The method of any one of paragraphs 25 through 28, wherein a temperature of the treatment solution is at least 150° F.

Paragraph 30. The method of any one of paragraphs 25 through 29, comprising contacting the carbon steel tubing with the treatment solution for at least five hours.

Paragraph 31. The method of any one of paragraphs 25 through 30, comprising contacting the carbon steel tubing with the treatment solution for at least ten hours.

Paragraph 32. The method of any one of paragraphs 25 through 31, comprising contacting the carbon steel tubing with the treatment solution for at least fifteen hours.

Paragraph 33. The method of any one of paragraphs 25 through 32, comprising contacting the carbon steel tubing with the treatment solution for at least twenty hours.

Paragraph 34. The method of any one of paragraphs 25 through 33, wherein salt includes at least one of sodium, magnesium, potassium, ammonium, and calcium.

Paragraph 35. The method of any one of paragraphs 25 through 34, wherein the salt includes at least one of chloride, phosphate, carbonate, and bicarbonate.

Paragraph 36. The method of any one of paragraphs 25 through 35, wherein a concentration of the salt in the treatment solution is at least 100,000 ppm by weight.

Paragraph 37. The method of paragraph 36, wherein the concentration of the salt in the treatment solution is at least 150,000 ppm by weight.

Paragraph 38. The method of paragraph 37, wherein the concentration of the salt in the treatment solution is at least 200,000 ppm by weight.

Paragraph 39. The method of any one of paragraphs 25 through 38, wherein a concentration of the sulfide ions in the treatment solution is at least 50 ppm by weight.

Paragraph 40. The method of paragraph 39, wherein the concentration of the sulfide ions in the treatment solution is at least 100 ppm by weight.

Paragraph 41. The method of paragraph 40, wherein the concentration of the sulfide ions in the treatment solution is at least 150 ppm by weight.

Paragraph 42. The method of paragraph 41, wherein the concentration of the sulfide ions in the treatment solution is at least 200 ppm by weight.

Paragraph 43. The method of any one of paragraphs 25 through 42, wherein a thickness of the iron sulfide layer on the carbon steel tubing is at least 10 μm.

Paragraph 44. The method of any one of paragraphs 25 through 43, wherein the iron sulfide layer forms a hydrophobic coating on the carbon steel tubing.

Paragraph 45. The method of any one of paragraphs 25 through 44, wherein a pH of the treatment solution is in a range of 2 to 10

Other Embodiments

It is to be understood that while embodiments have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating carbon steel tubing, the method comprising:
    pumping a first treatment solution comprising salt through a wellhead into carbon steel tubing in a wellbore in a subterranean formation for purpose of corroding the carbon steel tubing with the salt to facilitate forming of a protective layer comprising an iron sulfide layer on the carbon steel tubing, the salt comprising salt anions comprising at least one of sulfate, chloride, phosphate, carbonate, or bicarbonate, and salt cations comprising at least one of sodium, magnesium, potassium, or ammonium, wherein concentration of the salt in the first treatment solution is at least at least 100,000 ppm by weight;
    corroding the carbon steel tubing with the salt to yield a corroded surface on the carbon steel tubing;
    contacting the corroded surface on the carbon steel tubing with a second treatment solution comprising sulfide ions, wherein pH of the second treatment solution is in a range of 3 to 8; and
    forming the iron sulfide layer on the corroded surface of the carbon steel tubing by chemically bonding the sulfide ions in the second treatment solution with iron in the carbon steel tubing.

2. The method of claim 1, wherein the iron sulfide layer forms a hydrophobic coating on the carbon steel tubing, and wherein pumping the first treatment solution comprises pumping the first treatment solution from a source above the subterranean formation.

3. The method of claim 1, wherein:
    a temperature of the first treatment solution is at least 100° F.;
    the method comprises contacting the carbon steel tubing with the first treatment solution for at least five hours; and
    a concentration of the sulfide ions in the second treatment solution is at least 50 ppm by weight, and wherein contacting the corroded surface on the carbon steel tubing with the second treatment solution comprises pumping the second treatment solution from a source outside of the subterranean formation through the wellhead into the carbon steel tubing.

4. The method claim 3, wherein a thickness of the iron sulfide layer on the carbon steel tubing is at least 10 µm.

5. The method of claim 1, wherein:
    a temperature of the first treatment solution is at least 150° F.;
    the method comprises contacting the carbon steel tubing with the first treatment solution for at least ten hours;
    the concentration of the salt in the first treatment solution is at least 150,000 ppm by weight; and
    a concentration of the sulfide ions in the second treatment solution is at least 100 ppm by weight.

6. The method claim 1, wherein pumping the first treatment solution comprises pumping the first treatment solution from Earth surface above the subterranean formation.

7. The method claim 1, wherein a thickness of the iron sulfide layer on the carbon steel tubing is at least 10 µm, wherein the second treatment solution is different than the first treatment solution, and wherein pumping the first treatment solution comprises pumping the first treatment solution from Earth surface.

8. The method of claim 7, comprising pumping the second treatment solution through the wellhead into the carbon steel tubing, wherein pH of the first treatment solution is in a range of 2 to 10.

9. The method of claim 7, wherein the first treatment solution is provided to the carbon steel tubing before the second treatment is provided to the carbon steel tubing, wherein pH of the first treatment solution is in a range of 2 to 10.

10. A method of treating carbon steel tubing, the method comprising:
    pumping a treatment solution comprising salt from Earth surface through a wellhead into carbon steel tubing in a wellbore in an effort to corrode the carbon steel tubing with the salt and form a protective layer comprising an iron sulfide layer, the treatment solution comprising sulfide ions and the salt comprising at least one of sulfate, chloride, phosphate, carbonate, or bicarbonate, wherein the salt further comprises at least one of sodium, magnesium, potassium, or ammonium, and wherein concentration of the salt in the treatment solution is at least at least 100,000 ppm by weight;
    corroding the carbon steel tubing with the salt to yield a corroded surface on the carbon steel tubing; and
    forming the iron sulfide layer on the corroded surface of the carbon steel tubing by chemically bonding the sulfide ions with iron in the carbon steel tubing.

11. The method of claim 10, wherein the iron sulfide layer forms a hydrophobic coating on the carbon steel tubing.

12. The method of claim 10, wherein:
    a temperature of the treatment solution is at least 100° F.;
    the method comprises contacting the carbon steel tubing with the treatment solution for at least five hours; and
    concentration of the sulfide ions in the treatment solution is at least 50 ppm by weight.

13. The method of claim 12, wherein a thickness of the iron sulfide layer on the carbon steel tubing is at least 10 µm.

14. The method of claim 12, wherein a pH of the treatment solution is in a range of 2 to 10.

15. The method of claim 10, wherein:
    a temperature of the treatment solution is at least 150° F.;
    the method comprises contacting the carbon steel tubing with the treatment solution for at least ten hours;
    the concentration of the salt in the treatment solution is at least 150,000 ppm by weight; and
    concentration of the sulfide ions in the treatment solution is at least 100 ppm by weight.

16. The method of claim 10, wherein a thickness of the iron sulfide layer on the carbon steel tubing is at least 10 µm.

17. The method of claim 10, wherein a pH of the treatment solution is in a range of 2 to 10.

* * * * *

UNITED STATES PATENT AND TRADEMARK OFFICE
CERTIFICATE OF CORRECTION

PATENT NO. : 11,313,043 B2
APPLICATION NO. : 15/919900
DATED : April 26, 2022
INVENTOR(S) : Chang et al.

Page 1 of 1

It is certified that error appears in the above-identified patent and that said Letters Patent is hereby corrected as shown below:

In the Claims

Column 9, Line 30, Claim 1, delete "at least at least" and insert -- at least --;

Column 9, Line 60, Claim 4, before "claim" insert -- of --;

Column 10, Line 5, Claim 6, before "claim" insert -- of --;

Column 10, Line 8, Claim 7, before "claim" insert -- of --;

Column 10, Line 36 (approx.), Claim 10, delete "at least at least" and insert -- at least --.

Signed and Sealed this
Twelfth Day of July, 2022

Katherine Kelly Vidal
*Director of the United States Patent and Trademark Office*